(12) United States Patent
Strazisar et al.

(10) Patent No.: US 10,383,498 B2
(45) Date of Patent: Aug. 20, 2019

(54) SYSTEMS AND METHODS TO COMMAND A ROBOTIC CLEANING DEVICE TO MOVE TO A DIRTY REGION OF AN AREA

(71) Applicant: Lenovo (Singapore) Pte. Ltd., New Tech Park (SG)

(72) Inventors: Bradley Park Strazisar, Cary, NC (US); Timothy Winthrop Kingsbury, Cary, NC (US); Carolyne Rose Sealy, Morrisville, NC (US); Xiaohua Xu, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 219 days.

(21) Appl. No.: 15/285,979

(22) Filed: Oct. 5, 2016

(65) Prior Publication Data
US 2018/0092499 A1 Apr. 5, 2018

(51) Int. Cl.
| | | |
|---|---|---|
| A47L 11/40 | (2006.01) | |
| G05D 1/00 | (2006.01) | |
| G05D 1/02 | (2006.01) | |
| A47L 9/28 | (2006.01) | |
| A47L 9/30 | (2006.01) | |

(52) U.S. Cl.
CPC ......... *A47L 11/4011* (2013.01); *A47L 9/2852* (2013.01); *A47L 9/2894* (2013.01); *A47L 9/30* (2013.01); *G05D 1/0246* (2013.01); *G05D 1/0297* (2013.01); *A47L 2201/00* (2013.01); *A47L 2201/04* (2013.01); *A47L 2201/06* (2013.01); *G05B 2219/45098* (2013.01); *G05D 1/0022* (2013.01); *G05D 2201/0203* (2013.01); *G05D 2201/0215* (2013.01)

(58) Field of Classification Search
CPC ............. A47L 11/4011; A47L 2201/00; A47L 2201/04; A47L 2201/06; G05B 2219/45098; G05D 1/0022; G05D 1/0246; G05D 1/0297; A47L 2201/0203
USPC ................. 134/18; 382/153; 700/245; 901/1
See application file for complete search history.

(56) References Cited

U.S. PATENT DOCUMENTS

| | | | |
|---|---|---|---|
| 2014/0124004 A1* | 5/2014 | Rosenstein | ........... A47L 9/2852 134/18 |
| 2014/0207282 A1* | 7/2014 | Angle | ................... H04L 12/282 700/257 |

OTHER PUBLICATIONS

"Roomba", Wikipedia, Retrieved from "https://en.wikipedia.org/wiki/Roomba" on Sep. 1, 2016.

\* cited by examiner

*Primary Examiner* — Levon J Shahinian
(74) *Attorney, Agent, or Firm* — John L. Rogitz; John M. Rogitz (57) ABSTRACT

In one aspect, a device includes a processor and storage accessible to the processor. The storage bears instructions executable by the processor to receive an image of an area from a camera, and to execute image recognition on the first image to identify a dirty region in the area. Based on the identification of the dirty region, the instructions are executable to generate a command for a robotic cleaning device to move to the dirty region for facilitating cleaning of the dirty region by the robotic cleaning device.

20 Claims, 5 Drawing Sheets

SYSTEMS AND METHODS TO COMMAND A ROBOTIC CLEANING DEVICE TO MOVE TO A DIRTY REGION OF AN AREA

FIELD

The present application relates generally to systems and methods for commanding a robotic cleaning device to move to a dirty region of an area.

BACKGROUND

As recognized herein, robotic cleaning devices such as but not limited to robotic vacuum cleaners typically operate using algorithms that focus on floor coverage. This can lead to very long vacuum times and the robot possibly missing dirty areas that are obvious to humans. This problem is caused by the robot's very limited awareness of its surroundings and which spots are the dirtiest, if such an awareness exists at all.

Furthermore, while some robotic vacuums may use sensors to detect how much dirt is being cleaned up, those robots discover dirty areas only through prolonged trial and error.

SUMMARY

Accordingly, in one aspect a device includes a processor and storage accessible to the processor. The storage bears instructions executable by the processor to receive at least a first image of at least one area from at least one camera, and to execute image recognition on the first image to identify a dirty region in the area. The instructions are executable to, based on the identification of the dirty region, generate a signal for a first robotic cleaning device to move to the dirty region for facilitating cleaning of the dirty region by the first robotic cleaning device.

In example embodiments, the first robotic cleaning device may include a vacuum.

In some examples, the device may be implemented in a network server receiving images from the camera and wirelessly communicating with the first robotic cleaning device. In other examples, the device may be implemented in the first robotic cleaning device.

Additionally, in some embodiments the instructions may be executable to, responsive to a first output of the executing image recognition on the first image to identify a dirty region in the area, generate the signal for the first robotic cleaning device to move to the dirty region, whereas responsive to a second output of the executing image recognition on the first image to identify a dirty region in the area, the instructions may be executable to generate a signal for a second robotic cleaning device to move to the dirty region. The first and second outputs may indicate respective first and second types of dirty regions.

Also, if desired the instructions can be executable to, activate an illuminating device to illuminate the dirty region responsive to identifying the dirty region in the area.

Further, in some embodiments the signal for the first robotic cleaning device to move to the dirty region may be generated at least in part using indoor global position satellite (GPS) mapping locations of the area and coordinates of the dirty region in relation to the locations of the area. Additionally or alternatively, the signal for the first robotic cleaning device to move to the dirty region may be generated at least in part using spatial analysis to derive a location of the dirty region based at least in part on a known location of an object that is also recognized in the image of the area. Even further, the first robotic cleaning device may move to the dirty region based at least in part on using triangulation of beacon signals in the area.

In another aspect, a computer readable storage medium (CRSM) that is not a transitory signal includes instructions executable by a processor to receive at least a first image of at least one area, and to identify, using at least one digital processor, a dirty region in the area. The instructions are executable to, based on the identification of the dirty region, command a first robotic cleaning device to move to the dirty region for facilitating cleaning of the dirty region by the first robotic cleaning device.

In another aspect, a method includes executing image recognition of at least one image of an area, determining whether the image recognition indicates a region of the area satisfying a test, and controlling a first robotic cleaning device to move to the region responsive to a determination that the region satisfies the test.

The details of present principles, both as to their structure and operation, can best be understood in reference to the accompanying drawings, in which like reference numerals refer to like parts, and in which:

DETAILED DESCRIPTION

The problems identified above are addressed by relying on one or more cameras that are placed throughout the area that needs to be cleaned. Examples of such cameras include smart house camera systems and/or home security cameras. A device undertaking present principles may operate by collecting a series of images from the cameras and analyzing them to identify areas that contain dirt or debris that should be vacuumed. If a dirty section of floor is recognized, then the precise location may be determined by the device using a variety of possible mechanisms (such as GPS or relative positioning) and instructions may be sent to a robotic vacuum cleaner to clean the location. Accordingly, instead of searching aimlessly for dirt, the robotic vacuum cleaner may proceed directly to the problem area.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
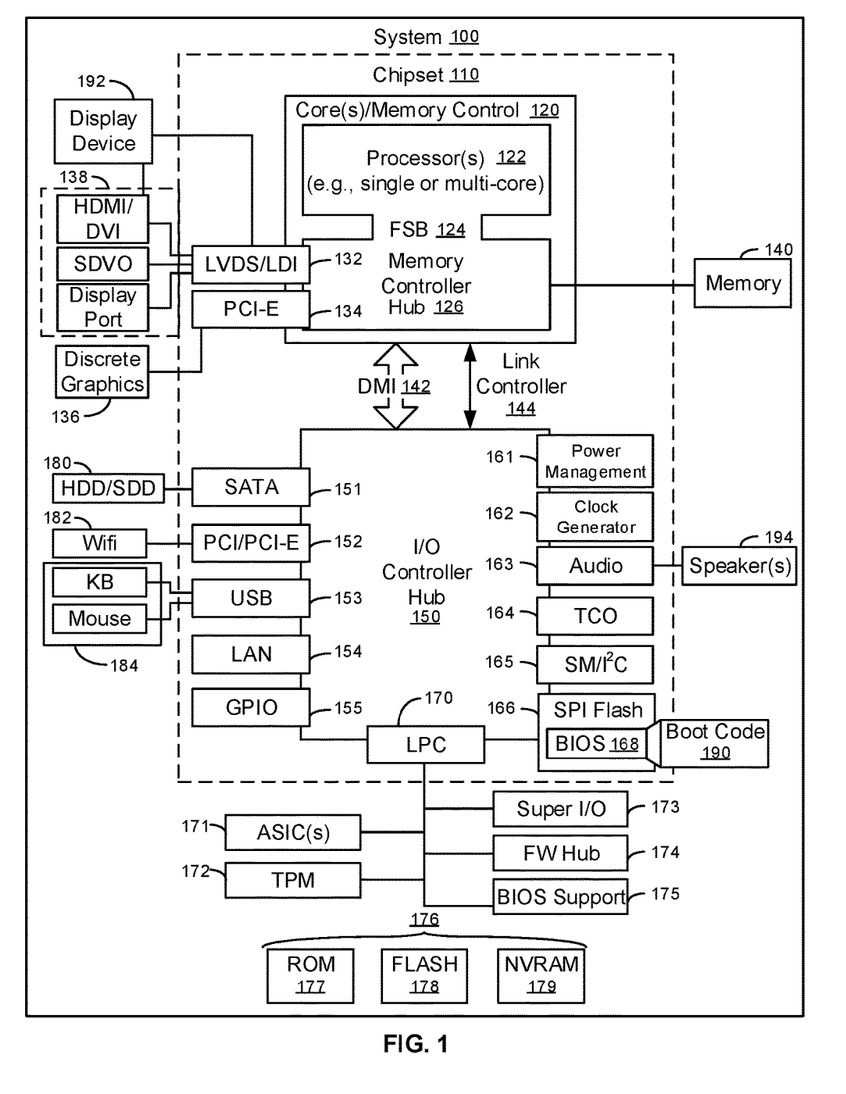
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB) and mice, microphones and various other devices (e.g., cameras including both visible spectrum cameras an infrared cameras such as forward looking infrared (FLIR) cameras, phones, storage, media players, etc. including input devices as may be described further below).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera such as mentioned above for the input device 184 that gathers one or more visible and/or IR images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Additionally, an input device 184 may be implemented by a proximity sensor such as a radiofrequency identification (RFID) sensor or IR sensor (for sending body heat) other proximity sensor.

Still further, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
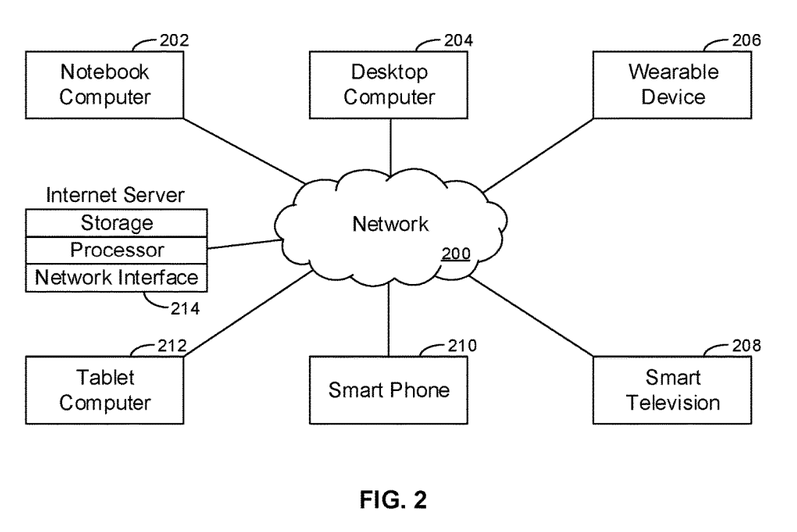
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles. The below-described robotic vacuums may be embodied as computer devices having one or more of the components shown and described in reference to FIG. 1 and may be part of the network 200.

Figure 3:
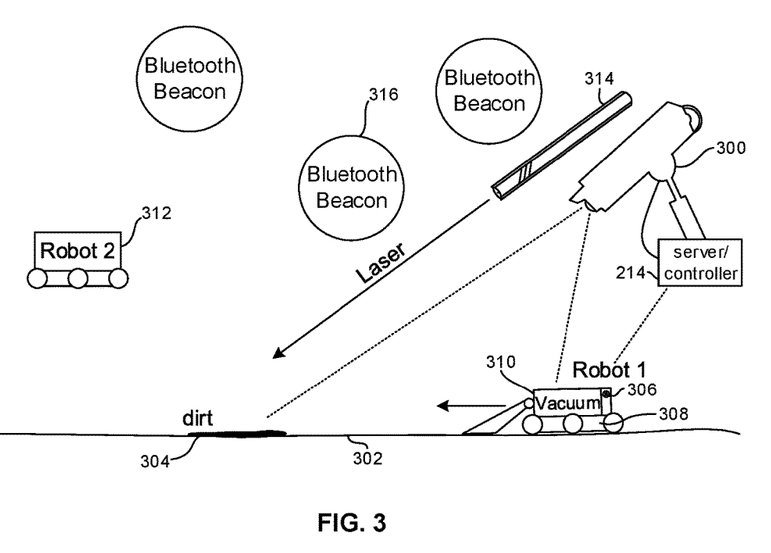
FIG. 3 is a schematic diagram to illuminate present disclosure.

Turn now to FIG. 3. One or more cameras 300 such as but not limited to digital video and/or still image cameras may be located near a surface 302 such as but not limited the floor of a room in a building. The surface 302 may have one or more regions 304 requiring cleaning. The region 304 may be, for example, a dirty region on a floor such as a carpet or hardwood or tile floor. By "dirty" is meant stained or soiled or otherwise in a state requiring cleaning. The camera(s) 300 are positioned to image the surface 302.

A robot camera 306 may be mounted on a first mobile robotic cleaning device 308 which in the example shown includes a vacuum 310 for vacuuming dirty regions 304. The robotic cleaning device 306 is located on or near the surface 302 as shown. If desired, a second robotic cleaning device 312 may also be on or near the surface 302 and may be a different type of robotic device (e.g., may have a different type of vacuum and/or may have a mop for cleaning liquids) than the first robotic device 308. Thus, in some examples the first robotic cleaning device 308 may be a robotic device for cleaning up liquids such as water or milk (e.g., from a hardwood floor), while the second robotic cleaning device 312 may be a robotic device for cleaning up loose or dry particles such as dirt or dust (e.g., from a carpeted floor).

If desired, one or more illuminators 314 such as but not limited to lasers or light emitting diodes (LEDs) may be located to illuminate the surface 302. Also, plural beacon devices 316 such as Bluetooth beacon devices may be located near the robotic devices 308, 312 for purposes to be shortly disclosed.

As also shown, the server/controller 214 described in relation to FIG. 2 may communicate via a wired and/or wireless path with one or more of the cameras shown in FIG. 3, as well as with one or both robotic devices 308, 312, illuminators 314, and beacon devices 316.

Figure 4:
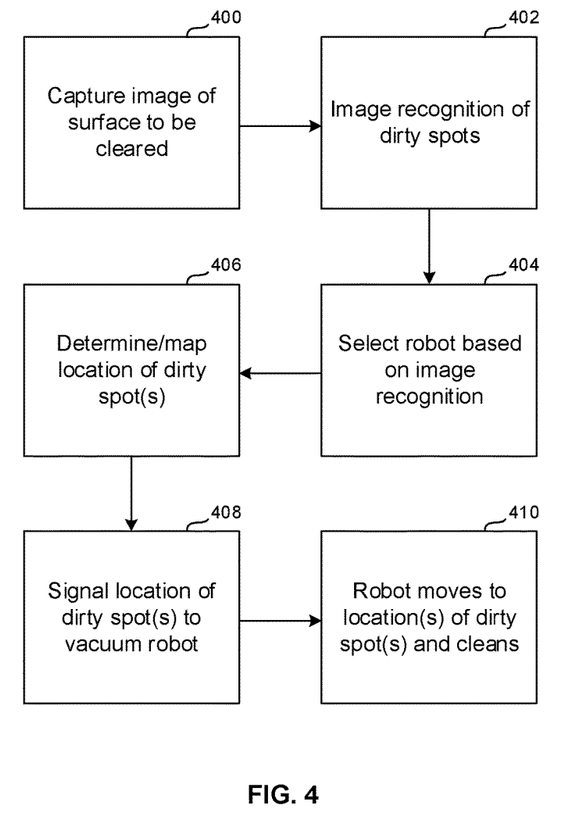
FIG. 4 is a flow chart of example logic.

FIG. 4 illustrates example logic. The logic of FIG. 4 may be executed by one or more processors within the imaging cameras of FIG. 3, or by the server 214 receiving images from the camera(s) of FIG. 3 and communicating with the robotic devices 308, 312, or by one or more processors in one or both of the robotic devices 308, 312 receiving images from their respective cameras 306 and/or the camera 300, and/or by a combination of the above components. The server 214 may be, for example, a server in the building in which the floor and/or robotic devices are located, or a cloud-based server operating remotely.

Beginning at block 400, one or more of the cameras of FIG. 3 capture an image of the surface 302. The image is processed using image recognition at block 402 to identify and/or reveal the dirty region 304. Proceeding to block 404, in some example implementations a robotic device 308, 312 is selected based on the image recognition. For example, if the first robotic device 308 is optimized for vacuuming carpet, and the second robotic device 312 is optimized for vacuuming hard floors, and the image from the camera reveals a dirty region on a carpet, the first robotic device 308 may be selected. On the other hand, if the image from the camera reveals a dirty region on a hard wood floor, the second robotic device 312 may be selected.

As another example, if the first robotic device 308 is optimized for cleaning liquids, and the second robotic device 312 is optimized for cleaning dry particles such as dirt and dust, and the image from the camera reveals a liquid dirty region, the first robotic device 308 may be selected. On the other hand, if the image from the camera reveals a dry particle dirty region, the second robotic device 312 may be selected.

Moving to block 406, the location of the dirty region is determined and, for example, mapped to an electronic map of the surface 302/room in which the surface 302 is located. Proceeding to block 408, the location is provided to the robotic device selected at block 404 if, for example, the logic is executed by the server 214; if the logic is executed wholly within the robotic device, the step at block 408 may be omitted since the robotic device already knows the location of the dirty region by virtue of block 406. At block 410 the selected robotic device in controlled to move to the location of the dirty region 304 and cleans the dirty region using, e.g., the vacuum 310.

In addition to the locating techniques described further below, a robotic device herein may be programmed with an electronic map of the room in which it is located. The dirty region recognized at block 402 may then be programmatically indicated on the map. The robotic device may have an onboard position sensor such as a GPS sensor, and using location indication from the sensor, locate itself on the map and, hence, determine the direction it should take to the dirty region.

Alternatively, the map may be used by the server 214, which, in addition to recognizing the dirty region 304, also recognizes the robotic device in the image at block 402 and its corresponding location and hence knows the direction for the robotic device to take to the dirty region. The server may thus send a command such as a wireless command to the robotic device to move in the direction toward the dirty region.

Indoor GPS may be used to inform the robotic device of the perimeters of the surface 302/building, and that data may also be given to the logic device controlling the cameras to derive X-Y coordinates of the dirty spot in relation to the perimeters, which may then be conveyed to the robotic device. In addition or alternatively, spatial analysis software may be used to derive the location of a dirty region when another location shown in and/or identified from the image is known.

The illuminators 314, which may be mounted next to each camera, can also be controlled to illuminate the dirty region. The robotic camera 306 on the robotic device 308 may then recognize the dirty region and move to the region to clean it at least in part by recognizing a floor area illuminated by one or more of the illuminators 314 (e.g., under control of the server/controller 214 and/or the robotic device 308 itself). In addition to lasers or LEDs by the camera, a laser bay and/or LED bay juxtaposed elsewhere may also be used. In one implementation, the illuminators are energized only after the dirty region has been recognized in an image, to save energy while providing illumination of a dirty region once it has been identified, to aid the robotic device in moving to and cleaning the region.

Also, the beacons 316 (such as Bluetooth beacons and/or Wi-Fi access points) may be triangulated by the robotic device so that the robotic device can know its location in the space it is in and thus navigate to the commanded location of the dirty region. In addition to or in lieu of the foregoing, received signal strength indicator (RSSI) may be used for such purposes.

Figure 5:
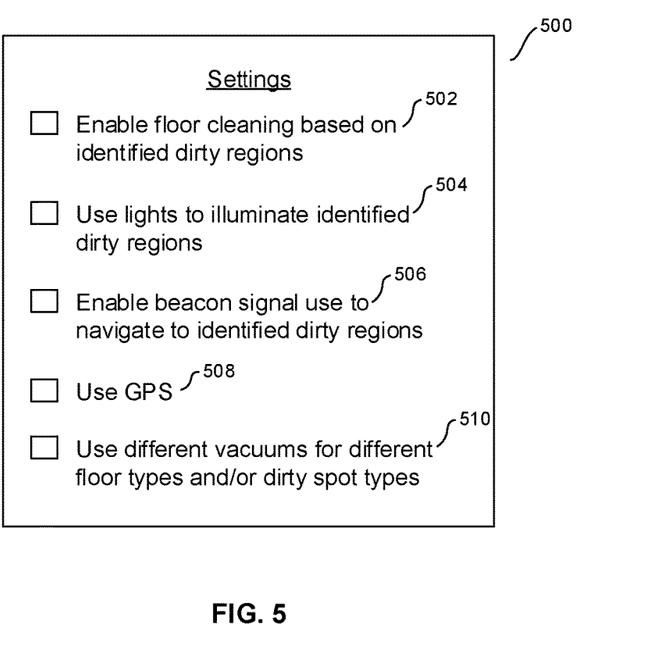
FIG. 5 is an example user interface (UI) in accordance with present principles.

FIG. 5 shows an example user interface (UI) 500 that is presentable on a display on and/or controlled by a device that executes the logic of FIG. 4 (e.g., a display accessible to the server 214). The UI 500 may include one or more options 502, 504, 506, 508, and 510 that are respectively enableable based on selection of the respective check box shown next to each one.

The option 502 may be selected to enable floor cleaning based on identification of one or more dirty regions in accordance with present principles (e.g., may be selected to configure the device to undertake the logic of FIG. 4). The option 504 may be selected to enable use of lights/illuminators to illuminate one or more identified dirty regions in accordance with present principles. The option 506 may be selected to enable beacon signal use for a robotic vacuum to navigate to one or more identified dirty regions in accordance with present principles. The option 508 may be selected to enable use of GPS for a robotic vacuum to navigate to one or more identified dirty regions in accordance with present principles. The option 510 may be selected to enable use of different vacuums for cleaning one or more dirty regions based on one or both of the type of floor at which the dirty region is located and the type of dirty region itself (e.g., a liquid region or a dry particle region).

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor;
storage accessible to the processor and bearing instructions executable by the processor to:
receive, from at least one camera, at least a first image of at least one area;
execute image recognition on the first image to identify a dirty region in the area;
determine, using the image recognition, a type of dirtiness at least in part characterizing the dirty region;
responsive to a determination that dirty region has a first type of dirtiness, generate a signal for a first robotic cleaning device having a first component to move to the dirty region; and
responsive to a determination that dirty region has a second type of dirtiness different from the first type of dirtiness, generate a signal for a second robotic cleaning device having a second component to move to the dirty region, the second robotic cleaning device being different from the first robotic cleaning device, the second component being different from the first component, the second component not being included on the first robotic cleaning device, the first component not being included on the second robotic cleaning device.

2. The device of claim 1, wherein the first robotic cleaning device moves to the dirty region based at least n part on using triangulation of beacon signals in the area.

3. The device of claim 1, wherein the first component is a vacuum, and wherein the second component is a mop.

4. The device of claim 1, wherein the first component is configured for collecting dry particles, and wherein the second component is configured for collecting liquids.

5. The device of claim 1, wherein the first component is optimized for vacuuming carpet, and wherein the second component is optimized for vacuuming hardwood floors.

6. The device of claim 1, wherein the type of dirtiness is characterized by both a type particle existing in the dirty region and a type of surface on which particles of the particle type exist.

7. A computer readable storage medium (CRSM) that is not a transitory signal, the computer readable storage medium comprising instructions executable by a processor to:
receive at least a first image of at least one area;
identify, using at least one digital processor, a dirty region in the area; and
based on the identification of the dirty region, command a first robotic cleaning device to move to the dirty region for facilitating cleaning of the dirty region by the first robotic cleaning device in accordance with input received from at least one user interface (UI) comprising at least two selections selected from the following:
a first selection to enable floor cleaning based on identification of one or more dirty regions;
a second selection to enable use of illuminators to illuminate one or more identified dirty regions;
a third selection to enable beacon signal use for the first robotic cleaning device to navigate to one or more identified dirty regions;
a fourth selection to enable use of global positioning satellite (GPS) for the first robotic cleaning device to navigate to one or more identified dirty regions; and
a fifth selection to enable use of different robotic cleaning devices for cleaning one or more dirty regions based on one or both of type of floor at which the dirty region is located and type of dirty region itself.

8. The CRSM of claim 7, wherein the CRSM is implemented in a network server receiving images and wirelessly communicating with the first robotic cleaning device.

9. The CRSM of claim 7, wherein the instructions are executable by the processor to:
responsive to identifying the dirty region in the area, activating a light to illuminate the dirty region.

10. The CRSM of claim 7, wherein the input is received from the first selection of the UI.

11. The CRSM of claim 7, wherein the input is received from the second selection of the UI.

12. The CRSM of claim 7, wherein the input is received from the third selection of the UI.

13. The CRSM of claim 7, wherein the input is received from the fourth selection of the UI.

14. The CRSM of claim 7, wherein the input is received from the fifth selection of the UI.

15. A method, comprising:
executing image recognition of at least one image of an area;
determining using, at least in part, the image recognition, a type of dirtiness characterizing a region of the area;
responsive to a determination that the region has a first type of dirtiness, controlling a first robotic cleaning device having a first configuration to move to the region; and
responsive to a determination that the region has a second type of dirtiness, controlling a second robotic cleaning device having a second configuration to move to the region, the second configuration being different from the first configuration.

16. The method of claim 15, wherein the method is performed by a server receiving the image from a camera.

17. The method of claim 15, comprising:
responsive to determining that the image recognition indicates the region as being a first type of region, controlling the first robotic cleaning device to move to the region; and
responsive to determining that the image recognition indicates the region as being a second type of region different from the first type of region, controlling a second robotic cleaning device to move to the region.

18. The method of claim 15, wherein the first configuration comprises a configuration for collecting dry particles, and wherein the second configuration comprises a configuration for collecting liquids.

19. The method of claim 15, wherein the first configuration comprises a \ nut and wherein the second configuration comprises a mop.

20. The method of claim 15, wherein the first configuration is one optimized for vacuuming carpet, and wherein the second configuration is one optimized for vacuuming hardwood floors.

* * * * *